United States Patent
Airey et al.

(10) Patent No.: US 8,248,420 B2
(45) Date of Patent: Aug. 21, 2012

(54) METHOD AND SYSTEM FOR DISPLAYING ANIMATION WITH AN EMBEDDED SYSTEM GRAPHICS API

(75) Inventors: John Airey, Mountain View, CA (US); Michael Bruno, Los Altos Hills, CA (US); Johannes Peter Govaars, Aptos, CA (US); Samuel Chiming Wang, Milpitas, CA (US)

(73) Assignee: Hooked Wireless, Inc., Los Altos Hills, CA (US)

( * ) Notice: Subject to any disclaimer, the term of this patent is extended or adjusted under 35 U.S.C. 154(b) by 0 days.

(21) Appl. No.: 13/028,833

(22) Filed: Feb. 16, 2011

(65) Prior Publication Data

US 2011/0134119 A1 Jun. 9, 2011

Related U.S. Application Data

(63) Continuation of application No. 11/321,042, filed on Dec. 30, 2005, now Pat. No. 7,911,467.

(51) Int. Cl.
*G06T 13/00* (2011.01)

(52) U.S. Cl. .................... 345/473; 345/419; 345/420

(58) Field of Classification Search ............... None
See application file for complete search history.

(56) References Cited

U.S. PATENT DOCUMENTS

| | | | |
|---|---|---|---|
| 6,476,813 B1 * | 11/2002 | Hansen | 345/427 |
| 6,621,939 B1 * | 9/2003 | Negishi et al. | 382/291 |
| 6,647,535 B1 * | 11/2003 | Bozdagi et al. | 715/255 |
| 6,801,224 B1 * | 10/2004 | Lewallen | 715/746 |
| 6,919,896 B2 * | 7/2005 | Sasaki et al. | 345/505 |
| 7,420,574 B2 * | 9/2008 | Santos | 345/646 |
| 2002/0118275 A1 * | 8/2002 | Harman | 348/51 |
| 2007/0192818 A1 * | 8/2007 | Bourges-Sevenier et al. | 725/132 |

OTHER PUBLICATIONS

*Appendix I—Version 2.0*, pp. 340-344 (Oct. 22, 2004).
Blythe, D., *OpenGL® ES Common/Common-Lite Profile Specification*, Version 1.0.02 (Annotated), The Khronos Group Inc., pp. i-ii and 1-80 (Copyright 2002-2004), Jul. 2004.
Chapman, N. and Chapman, J., *Digital Multimedia*, John Wiley & Sons, Ltd., pp. v-ix and 348-375 (Copyright 2000), May 2000.
*Concepts—SCG 1.1-20030114*, 4 pages, printed Dec. 10, 2005 from http://www.w3/org/TR/SVG/concepts.html (Jan. 14, 2003).
Karvir, V. *White Paper: Delivering Enterprise Applications, Content, and Communications with the Flash® Platform*, Macromedia, Inc., pp. 1-21 (Jun. 2005).
*Macromedia—Shockwave Player TechNote: Macromedia Shockwave Player Support FAQ*, Adobe Systems Incorporated, 6 pages, printed Dec. 30, 2005 from http://www.macromedia.com/cfusion/knowledgebase/index.cfm?id=tn_15508. (Copyright 2005).
*OpenGL ES 2.X and the OpenGL ES Shading Language for programmable hardware*, 5 pages, printed Dec. 10, 2005 from http://www.khronos.org/opengles/2_X. *OpenGL ES Overview*, 7 pages, printed Dec. 10, 2005 from http://www.khronos.org/opengles/.
Rasmussen, J. et al., "Multimedia in mobile phones—The ongoing revolution," *Ericsson Review*, No. 2, pp. 98-107 (2004), Feb. 2004.
Schewchuk, J.R., *Triangle: A Two-Dimensional Quality Mesh Generator and Delaunay Triangulator*, 3 pages, printed Dec. 29, 2005 from http://www.cs/cmu/edu/~quake/triangle.html

* cited by examiner

*Primary Examiner* — Said Broome
(74) *Attorney, Agent, or Firm* — Sterne, Kessler, Goldstein & Fox PLLC

(57) ABSTRACT

An animation file player can display animation files with an embedded system graphics application programming interface (graphics API). In an example implementation, an animation file comprises a Flash® animation file such as, a Shockwave Flash® animation file, and the embedded system graphics API comprises an OpenGL®|ES graphics API. The present invention is not intended to be so limited, and other types of animation files and embedded system graphics APIs can be used.

21 Claims, 8 Drawing Sheets

METHOD AND SYSTEM FOR DISPLAYING ANIMATION WITH AN EMBEDDED SYSTEM GRAPHICS API

This application is a continuation of U.S. patent application Ser. No. 11/321,042, filed Dec. 30, 2005, which is incorporated by reference herein in its entirety.

BACKGROUND OF THE INVENTION

1. Field of the Invention

The present invention relates to file players and graphics animation.

2. Background Art

Animation is increasingly popular in a variety of applications. No longer restricted to film, animation is now implemented in many digital forms and is found on the World Wide Web and in many multimedia applications. A variety of animation files and animation file players are available. Animation of varying length can be displayed on computers as stand-alone movies and video clips, or as part of web pages and in multimedia presentations. The complexity of an animation and the amount of graphics processing power required to generate the animation can vary widely depending upon a particular application.

One type of animation file player, currently in widespread use is the Flash® or Shockwave Flash® (SWF) animation file player, available from Adobe Systems, Incorporated (formerly Macromedia Inc.). SWF file players play a compiled form of Flash® animation files. For convenience, any such Flash® or Shockwave Flash® (SWF) animation file players are referred to herein as "SWF file players." Associated files that can be played by SWF file players are referred to herein as "Flash® animation files" or simply "Flash® animation." Flash® animation files were designed to hold relatively simple vector and bitmap animations in small file sizes. Accordingly, Flash® animation files have been used widely in web pages to provide simple animations, such as, rotating logos, walking figures, and dancing text. One common SWF file player is a desktop personal computer player typically installed as a Web Browser Plugin.

Graphics application programming interfaces (APIs) are now widely used by many computer graphics applications (such as, computer games, flight simulators, modeling applications, etc.) and support hardware acceleration of graphics rendering. Graphics APIs, such as, OpenGL® API available from SGI and DirectX API available from Microsoft Corp., are designed to run on personal computers or other computing devices with significant processing and display resources. Newer graphics APIs, such as, an OpenGL®|ES API, are now available that are designed to run on embedded systems having limited resources, such as a mobile telephone having a smaller display resolution, less memory, and less processing power than a personal desktop computer.

A SWF file player, however, is widely believed not to take advantage of any graphics hardware acceleration or graphics application programming interface API. Possible technical and business motivations not to use the graphics hardware acceleration or graphics APIs include: historical portability since typical desktop personal computers did not have reliable graphics support when the SWF file player was first developed, rendering accuracy, and a desire to maintain careful control over the behavior of the SWF player. At the same time, the lack of use of any hardware acceleration API has been noted and bemoaned by producers of Flash® animations and the consumers of Flash® animations.

Some specialized, alternative SWF file players have recently been released that use an OpenGL® API, a considerably larger, heavyweight graphics API than an OpenGL®|ES API. The full-blown OpenGL® API, however, cannot be easily implemented on a resource contrained embedded system, such as a mobile phone. Further, these alternative OpenGL®-based SWF players make use of features not found in the smaller, lightweight OpenGL®|ES graphics API, such as the begin( )/end( ) paradigm of geometric data specification, and the texgen method of automatically generating texture coordinates from vertex data, thereby making them incompatible with devices having an OPENGL|ES API. Often the motivation for these alternative players is to have a SWF player on a desktop computing platform not supported commercially by Macromedia. These alternative players have required the use of the OpenGL® graphics API both to accelerate the rendering process and also to ease the programming burden.

BRIEF SUMMARY OF THE INVENTION

The inventors recognized that a file player is needed that displays animation on an embedded system and makes use of an embedded system graphics application programming interface (graphics API).

The present invention solves the above problems and allows the display or play back of animation files on an embedded system and makes use of an embedded system graphics API. A file player and animation techniques are provided which allow display of animation with an embedded system graphics API on an embedded system. This can include an embedded system with or without graphics hardware acceleration. Any type of embedded system can be used including, but not limited to, a mobile phone, kiosk, game console, vehicle navigation system, or other type of embedded computing device.

In one embodiment, an animation file player is provided that can display animation on a mobile device having a graphics subsystem. In particular, the animation file player can display Flash® animation files with an embedded system graphics API. In an example implementation, an animation file comprises a vector animation file such as, a Shockwave Flash® (SWF) animation file, and the embedded system graphics API comprises a mobile device graphics API, such as, an OpenGL® ES graphics API. The present invention is not intended to be so limited, and other types of animation files and embedded system graphics APIs can be used, including but not limited to, a Java (J2ME) implementation using JSR-239 or JSR-184 as the graphics API, or a Microsoft Direct3D Mobile graphics API.

In one embodiment, the animation file player includes a parser and a converter. The parser parses an animation file to obtain animation information that includes at least one of image data and object shape data associated with a frame in the animation. The converter converts the animation information to graphics rendering information. The graphics rendering information can be processed by the graphics subsystem of the graphics-enabled mobile device.

An animation file, such as a Flash® animation file, is a series of frames in a timeline of an animation. Each frame can have layers that are composited to make the final result. A layer often contains image data or object shape data. According to a further feature, for image data, such as bitmap data, the converter reduces the image data to texture data and generates polygons having texture coordinates mapped to the texture data.

According to a further feature, for object shape data, the converter converts object shape data to a collection of polygons having an area approximating the object shape area. In one example, the converter tessellates the object shape data at an acceptable degree of linear approximation in accordance with at least a display resolution of the graphics-enabled mobile device to obtain tessellated data. Object space data from a previous frame can also be re-used or morphed to reduce calculation work.

In a further embodiment, an embedded system (including but not limited to a graphics-enabled mobile device) is provided which includes, a display, a memory for storing an animation file, an embedded system graphics API, and an animation file player that converts animation information in the animation file to graphics rendering information, and passes the graphics rendering information to the embedded system graphics API. The embedded system graphics API processes the graphics rendering information to obtain pixel data and outputs the pixel data to the display for display on the embedded system.

In a still further embodiment, a method for displaying animation through an embedded system graphics API on an embedded system is provided. The method includes parsing an animation file to obtain animation information that includes at least one of image data and object shape data associated with frames in the animation, converting the animation information to graphics rendering information, processing the graphics rendering information with the embedded system graphics API to obtain pixel data, and displaying the pixel data to show the animation.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 5 is a flowchart diagram that illustrates in further detail a method of conversion of animation file information that can be used within the method of FIG. 4 according to an embodiment of the present invention.

FIG. 6 is a flowchart diagram that illustrates in further detail a method of object space data conversion that can be used within the method of FIG. 5 according to an embodiment of the present invention.

The present invention will be described with reference to the accompanying drawings. The drawing in which an element first appears is typically indicated by the leftmost digit(s) in the corresponding reference number.

DETAILED DESCRIPTION OF THE INVENTION

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

The present invention allows the display or playback of animation files on an embedded system and makes use of an embedded system graphics application programming interface. A file player and animation techniques are provided which allow display of animation with an embedded system graphics application programming interface on an embedded system. This can include an embedded system with or without graphics hardware acceleration.

For the sake of clarity, embodiments of the present invention are described further below with respect to an example embedded system comprising a mobile device. The present invention is not so limited, and embodiments can include any type of embedded system including, but not limited to, a mobile phone, kiosk, game console, vehicle navigation system, or other type of embedded computing device, as would apparent to a person skilled in the art given this description.

A. Mobile Device Animation File Player System

Figures 1A, 1B:
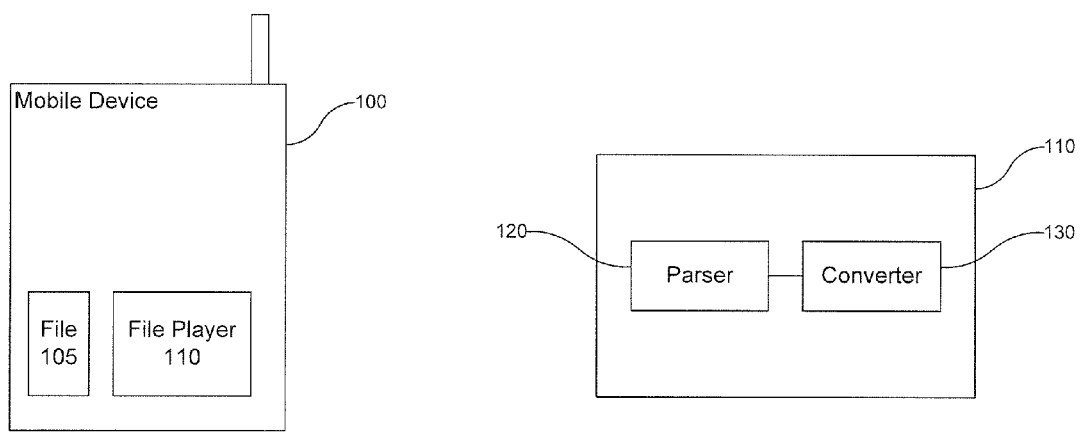
FIG. 1A is a diagram of a mobile device with an animation file player according to an embodiment of the present invention.
FIG. 1B is a diagram of an animation file player in further detail according to an embodiment of the present invention.

FIG. 1A is a diagram of a mobile device 100 with an animation file player 110 according to an embodiment of the present invention. Mobile device 100 can be a mobile phone, music player, personal data assistant (PDA), hand-held computer, or any other mobile computing device. In embodiments, mobile device 100 is further enabled to process and render any type of graphics data for display and is referred to as a "graphics-enabled mobile device." Mobile device 100 can include or not include graphics acceleration hardware.

Animation file player 110 can play animation on graphics-enabled mobile device 100. The term "play" with respect to animation is used broadly herein to refer to display, playback, or any other type of output provided for a user to perceive animation content. Animation file player 110 can be implemented in software, firmware, hardware or any combination thereof.

Figure 1C:
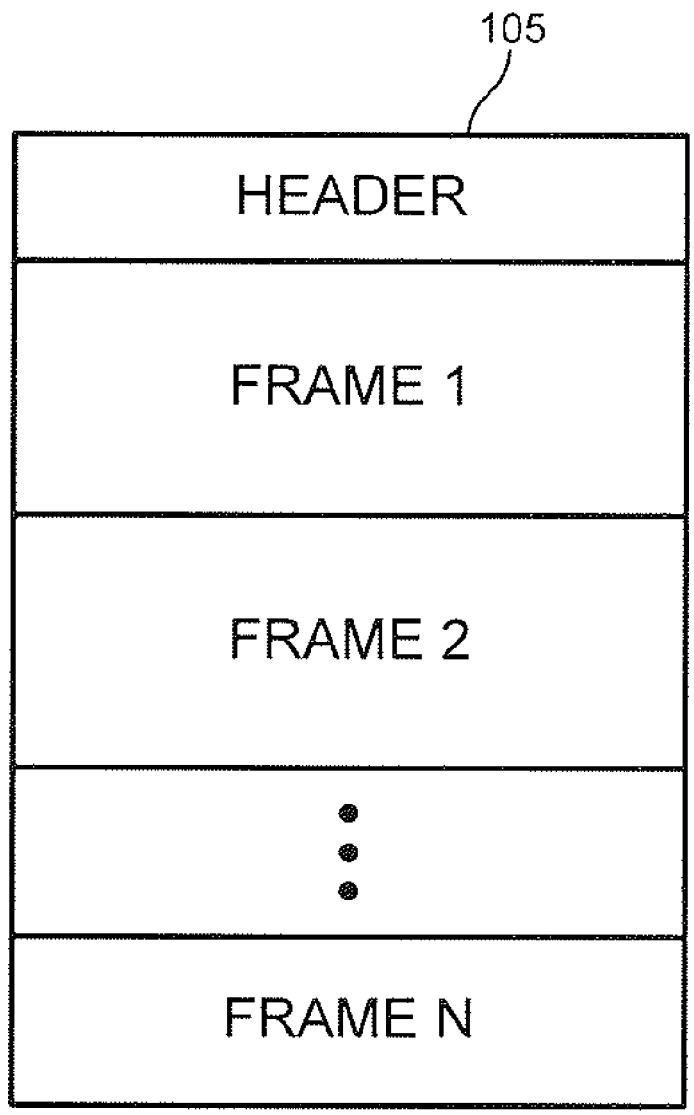
FIG. 1C is an illustration of an example animation file format structure containing animation file information.

In an embodiment, animation file 105 is any type of animation file including, but not limited to, a Flash® animation file made up of a series of frames 1 to n in a timeline of an animation (see FIG. 1C). Each frame can have layers (such as foreground and background layers) that are composited to make the frame. A layer often contains image data and/or object shape data. Animation file 105 can include, but is not limited to, an animation made up of keyframes and interpolated frames in-between the keyframes. Header data and other data fields can be added.

In one embodiment, as shown in FIG. 1B, animation file player 110 can include a parser 120 and converter 130. Parser 120 parses animation file 105 to obtain animation information that includes at least one of image data and object shape data associated with a frame in the animation. Converter 130 converts the animation information to graphics rendering information. The graphics rendering information can be processed by a graphics subsystem of graphics-enabled mobile device 100.

Figure 2:
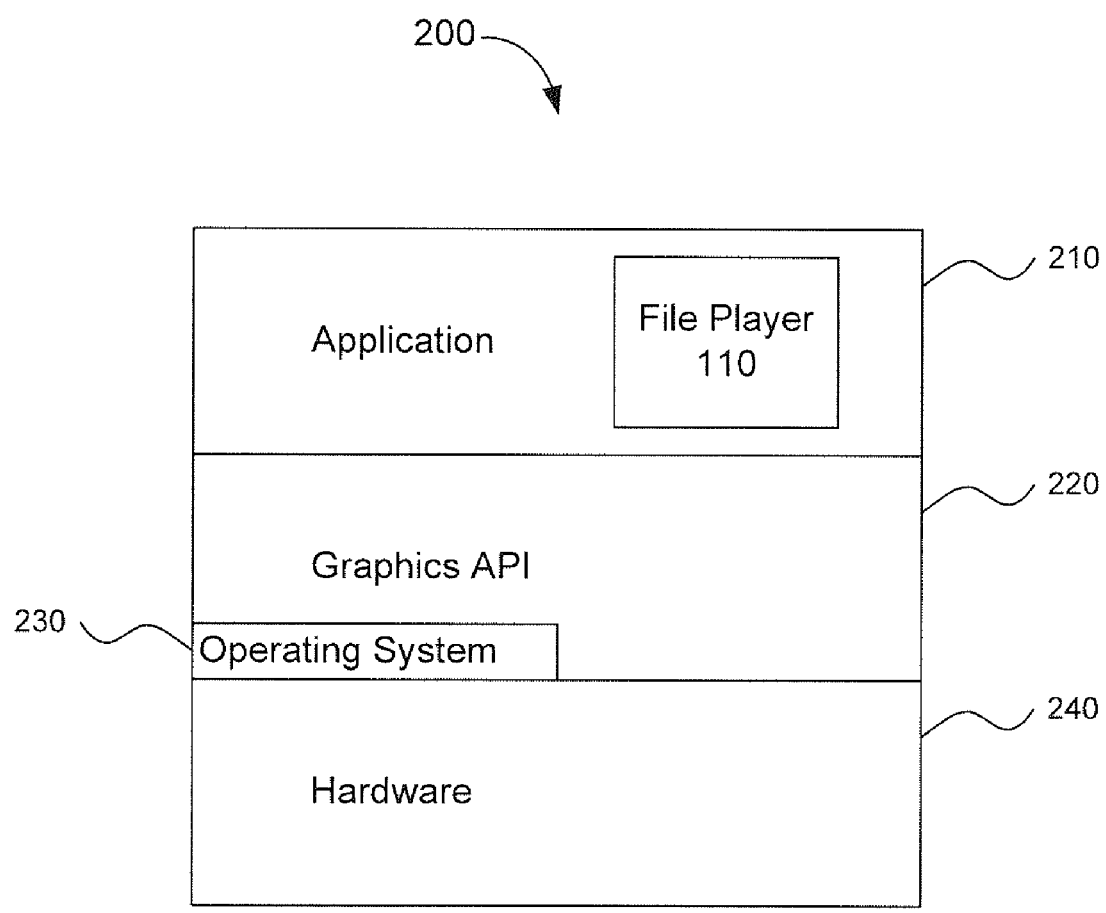
FIG. 2 is a diagram that illustrates a layered-architecture of an animation file player according to an embodiment of the present invention.
Figure 3:
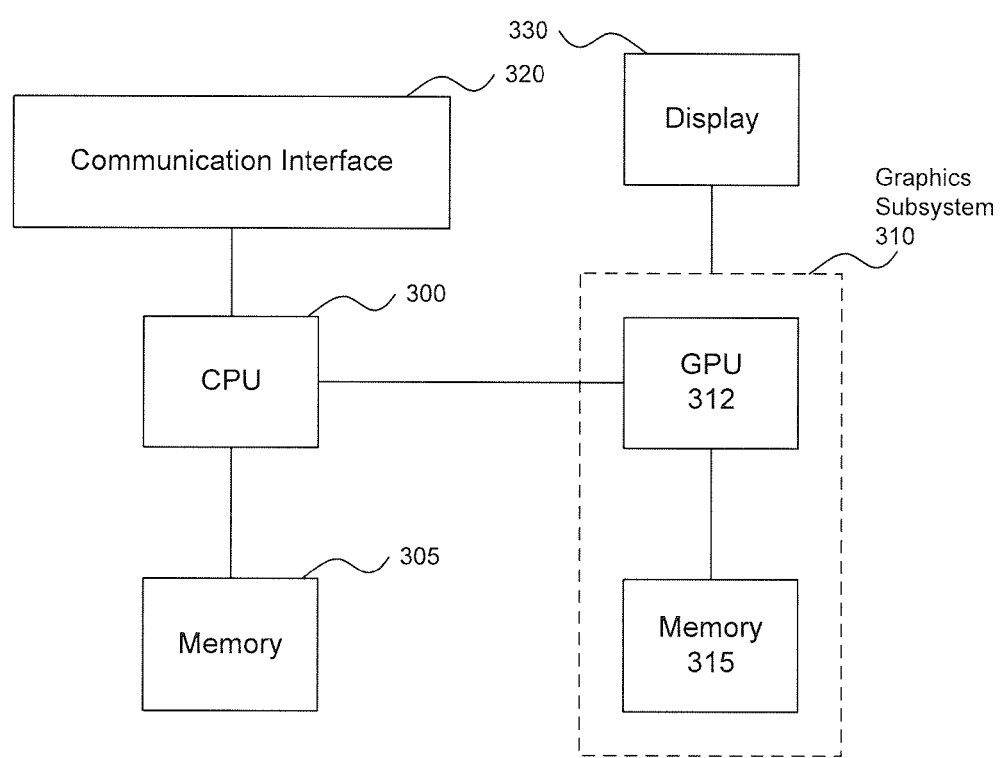
FIG. 3 is a diagram that illustrates example hardware in the layered-architecture of FIG. 2 according to an embodiment of the present invention.
Figure 6:
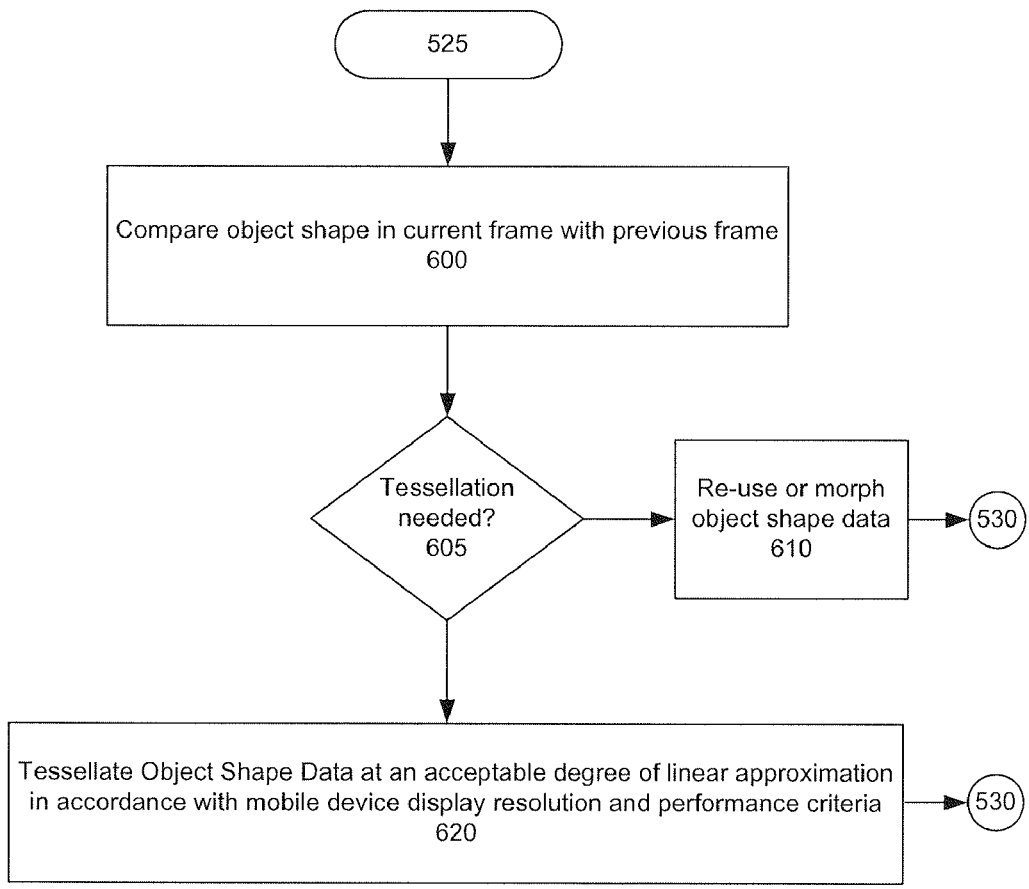
Figure 7:
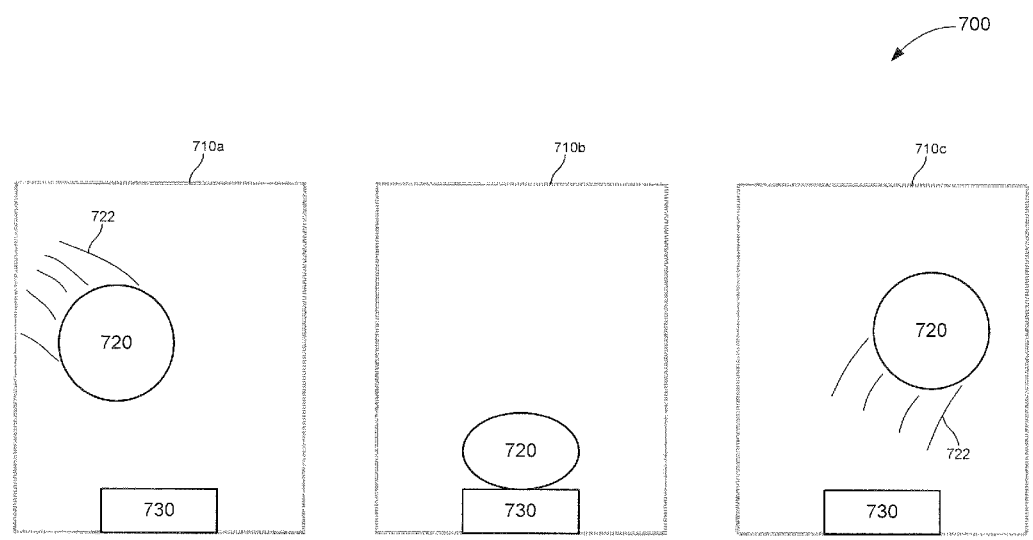
FIG. 7 is an illustration of key frames in an example animation.

It is helpful to describe animation file player 110 further with respect to an example layered architecture for graphics-enabled mobile device 100 (FIGS. 2 and 3). Next, the operation of animation file player 110 is described with reference to flowcharts (FIGS. 4-6) and an example animation (FIG. 7). This layered architecture, operation, and example is illustrative and not necessarily intended to limit the present invention.

In an embodiment, mobile device 100 is a graphics-enabled mobile device having an architecture 200. Architecture 200 includes an application layer 210, embedded system graphics application programming interface (graphics API) 220, operating system 230, and hardware 240.

In an embodiment, animation file player 110 can be included in application layer 210. Graphics API 220 can be any type of embedded system graphics API including, but not limited to, an OpenGL®|ES graphics API available from The Khronos Group, Inc., a Java (J2ME) implementation using JSR-239 or JSR-184 as the graphics API, or a Microsoft Direct3D Mobile graphics API. Other similar proprietary or open graphics APIs may be used as they become available as would be appreciated by a person skilled in the art given this description.

Operating system 230 can be any type of operating system for a mobile device including, but not limited to, Symbian, Microsoft Windows® Mobile, Palm OS®, or Apple operating environment for iPod® devices.

As shown in further detail in FIG. 3, hardware 240 can include a processor 300 coupled to memory 305, graphics subsystem 310, and communication interface 320. Graphics subsystem 310 further includes a graphics processor 312 and memory 315. Memory 315 can include texture memory for storing texture data and a frame buffer for storing pixel data output from graphics processor 312. A display 330 is coupled to graphics subsystem 310 to allow display of output pixel data. Communication interface 320 is any type of communication interface that allows data to be communicated to and from graphics-enabled mobile device 100. In one example, communication interface 320 is a wireless interface supporting voice and data communication over a network. Graphics subsystem 310 is illustrative and not intended to limit the present invention. Graphics subsystem 310 can include any type of renderer (software or hardware) and may include graphics acceleration hardware. Alternatively, graphics subsystem 310 need not have any graphics acceleration hardware for those embedded systems where such hardware is not desired to be included.

In an embodiment, animation file player 110 is an application in application layer 210. File player 110 "runs" in graphics-enabled mobile device 100 on top of graphics API 220 and operating system 230. In this way, file player 110 can access or leverage functionality in graphics API 220 to perform graphics data processing. For example, graphics rendering information (such as, commands and/or data) can be passed to graphics API 220 to carry out desired rendering. Such rendering can then be accelerated with graphics hardware depending upon whether the embedded system includes graphics acceleration hardware. File player 110 can also access or leverage functionality in operating system 230 as well. In this way, file player 110 may access system resources or memory in mobile device 100 through operating system 230. File player 110 can also be manually or automatically selected to run through operating system 230 or otherwise executed directly.

The operation of animation file player 110 will be described further with respect to a method for display for animation file information 400 (FIGS. 4-6) and an example animation (FIG. 7).

B. Mobile Device Animation File Player Operation

Figure 4:
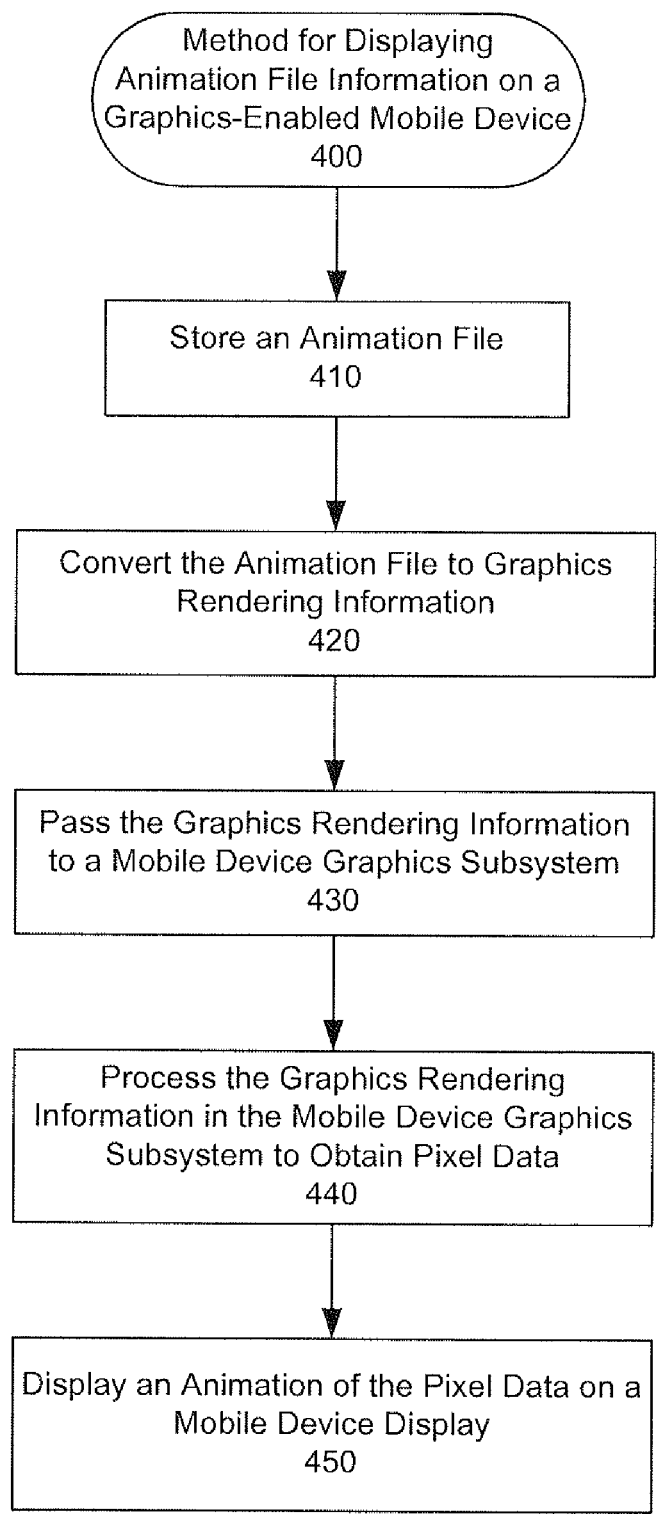
FIGS. 4-6 are flowchart diagrams of a method for displaying animation file information according to an embodiment of the present invention.

FIG. 4 is a flowchart diagram of a method for displaying animation file information 400 according to an embodiment of the present invention (steps 410-450). For brevity, method 400 is described with respect to mobile device 100 and animation file player 110 but is not intended to be limited to the structure therein.

In step 410, an animation file 105 is stored in memory 305 in mobile device 100. Such storage can be permanent or temporary, and can include storage in any type of memory or buffer. The animation file 105 can be downloaded through communication interface 320 over a network, pre-stored in mobile device 100 or otherwise loaded, buffered, or streamed into mobile device 100.

Animation file 105 can be any type of file having data to be animated. The data in the file can include, but is not limited to, any type of graphics data (static and/or dynamic), multimedia data, audio data, video data, text data, or combination thereof. Any type of file format compatible with animation can be used including, but not limited to, Flash® animation file format, such as, a Flash® animation file like a SWF file in a format promulgated by Adobe (formerly Macromedia, Inc.). Other animation file formats for display of animation can be used including, but not limited to, any vector animation file format.

FIG. 7 illustrates an example animation 700 that can be played by animation file player 110 on mobile device 100. Animation 700 includes a sequence of frames 710*a*-*c*. In this example, animation 700 shows a scene of a ball 720 bouncing off of base 730. Only three frames 710*a*-710*c* are shown for clarity; however, a large or small number of frames may be used depending upon the animation. Ball 720 moves down toward a base 730 (frame 710*a*), lands on base 730 (frame 710*b*), and moves up from base 730 (frame 710*c*). Motion lines 722 can be provided in frames 710*a* and 710*c* to highlight the direction of ball movement. Ball 720 deforms into a squished oval shape in frame 710*b* on impact with base 730.

Data representing animation 700 is stored in an animation file 105. In particular, animation file 105 includes digital data defining a header and frame data for a series of frames 1 to N. Each frame can include data that defines a scene for a frame to be animated. In the case of Flash® animation such as a SWF file, this frame data can include image data (such as bitmap(s)) and object shape data (such as vector data defining lines and curves, B-spline curve data, or other data defining shapes of object(s)). Other fields and data can be used depending upon a particular file format specification.

In step 420, animation file player 110 converts stored animation file 105 to graphics rendering information. Step 420 is described in further detail below with reference to FIGS. 5 and 6.

In step 430, animation file player 110 passes the graphics rendering information to graphics subsystem 310. This includes passing appropriate graphics rendering information to graphics API 220.

In step 440, graphics subsystem 310 processes the received graphics rendering information to obtain output pixel data. In the case of an OpenGL®|ES graphics API 220 output pixel data for the animation converted by file player 110 is output to a frame buffer in memory 315.

In step 450, the animation is played on display 330 on mobile device 100. In this way, animation content in an original animation file (not designed for graphics-accelerated mobile devices) can be converted and played on graphics-enabled mobile device 100. File player 110 converts animation files such that they can play animation on a limited resolution display of a mobile device and leverage graphics-accelerated hardware, if available, on a mobile device 100.

1. Animation Conversion

Figure 5:
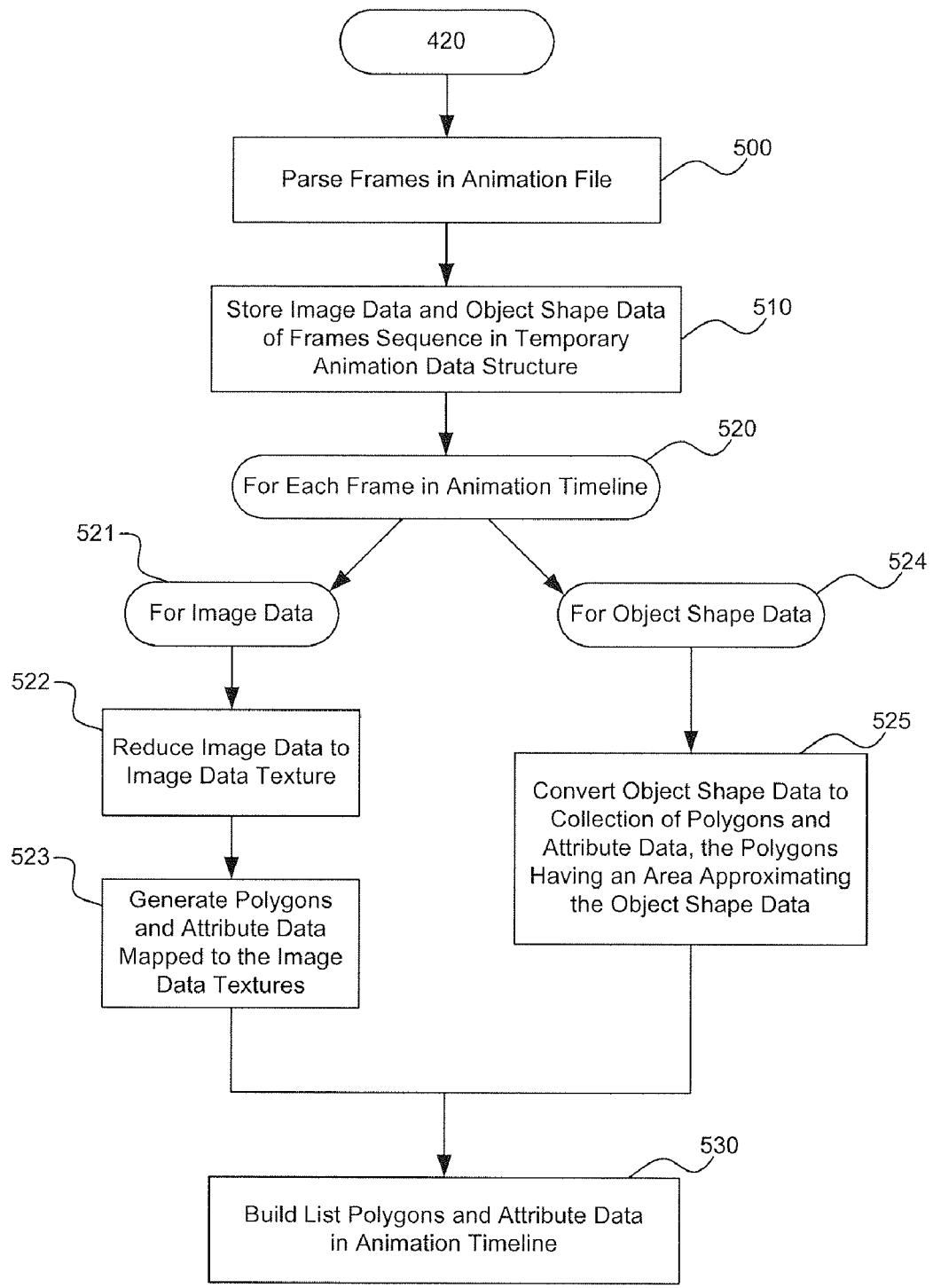

FIG. 5 is a flowchart diagram that illustrates in further detail a method of conversion of animation file information in step 420 of method 400 according to an embodiment of the present invention (steps 500-530).

In step 500, parser 120 parses frame data in an animation file stored in step 410. In the example of Flash® animation, parser 120 parses image data and/or object shape data from a sequence of frames in the animation file.

In step 510, file player 110 stores the parsed image data and/or object shape data from a sequence of frames (also called a timeline) into a temporary animation data structure.

Converter 130 then carries out step 520 on the parsed and stored data in the temporary animation data structure. For each frame in an animation timeline, converter 130 processes the parsed image data and/or object shape data (loop 520, steps 521-525).

For image data (loop 521), converter 130 reduces image data to image data texture (step 522), and generates polygons and attribute data mapped to the image data texture (step 523). For example, consider a bitmap representing an image such as sky in a scene in frame 710a. Such a bitmap may have been originally in a background layer of a Flash® animation file. In step 522, converter 130 reduces the bitmap to a texture with the sky image data. In step 523, converter 130 generates a polygon (e.g., a quadrilateral made up of two triangles, also called a four-vertex triangle strip). Vertices of the two triangles are assigned attribute data (e.g., texture coordinates that map to the sky texture).

For object shape data (loop 524), converter 130 converts parsed object shape data to a set of polygons and attributes data (such as color and texture coordinates). The set of polygons have an area that approximates the object shape data (step 525). In one implementation, converter 130 includes a tessellator to tessellate the object shape data into a set of polygons (e.g, triangles) having a configuration approximating the object shape data. In particular, object shape data in a frame is tessellated to an acceptable degree of linear approximation in accordance with the mobile device 100 display resolution and other performance criteria (such as, available computing power, complexity of animation scenes, etc.). Any known or future developed tesselation algorithm can be used. In one embodiment, the tesselation work in step 525 is carried out for object shape data in each frame of an animation.

Incases involving a SWF file and OPEN GL|ES API, a SWF file, object shape data can also have a bitmap mapped to it. Since the Flash® shape data does not have texture coordinates per se, instead it has a bitmap which is fixed to geometric coordinate data with a linear mathematical mapping. Converter 130 then translates the linear mathematical mapping to the OpenGL® ES API. According to a further feature, converter 130 reuses the geometric coordinate data (x and y) as texture coordinates and uses the OpenGL®|ES API capability of specifying a texture transform matrix to perform the required linear mapping from geometric coordinates to texture coordinates.

Once image data and object shape data for each frame have been processed and loop 520 completes, control proceeds to step 530. Converter 130 then builds graphics rendering information for graphics API 220 that includes the textures, polygons and attribute data generated in steps 520-525 for an animation sequence. For example, in the case where graphics API 220 comprises an OpenGL® ES API, converter 130 builds graphics rendering information that includes the textures, polygons and attribute data generated in steps 520-525 for an animation sequence that can be rendered as an animation by the OpenGL®|ES API and displayed on display 330 of mobile device 100.

Step 525 and step 530 are described in even further detail below in section 3 with reference to an example implementation of file player 110 involving SWF files and an OpenGL®|ES API.

2. Animation Conversion Optimization

According to a further embodiment, an optimization is provided that reduces tessellation calculation work. FIG. 6 is a flowchart diagram that shows the steps of an optimization of step 525. Converter 130 first compares object shape data in a current frame with object shape data in a previous frame (step 600). For instance, ball 720 changes shape at frame 710b compared to previous frame 710a. On the other hand, base 730 does not change shape significantly between frames 710a and 710b.

Based on the result of this comparison, a check is made to determine whether tessellation is needed (step 605). If object shape has not changed at all or insignificantly between frames, then tessellation is not needed and control passes to step 610. In this case, converter 130 can simply re-use prior tessellated data from the previous frame and avoid unnecessary tessellation work. Such re-use can be simply copying prior tessellated data, or applying a geometric transformation to the prior tessellated data to obtain new tessellated data for the object shape data in the current frame. For example, one or more transformation matrices for scaling, rotatiing and translating the prior tessellated object data can be applied. More complicated morphing or other types of transformation can also be carried out. In this way, new object shape data can be obtained for a current frame of an animation without necessarily having to carry out the tessellation work for each frame. In the case of Flash® animation, where motion tweening is used between frames (as in the case of the ball 720 moving but not changing shape) no re-tessellation is needed.

Of course, steps 600-610 are an optional optimization and can be omitted in applications where tessellation is carried out for each frame of an animation as described earlier. Control then proceeds back to step 530.

In step 605, when object shape data has changed significantly in a current frame or appears for the first time in a current frame, control proceeds to step 620. In step 620, converter 130 tessellates the object shape data into a set of polygons (e.g, triangles) having an area approximating the object shape data. In particular, object shape data in a frame is tessellated to an acceptable degree of linear approximation in accordance with the mobile device 100 display resolution and other performance criteria (such as, available computing power, complexity of animation scenes, etc.). Any known or future developed tesselation algorithm can be used. Control then proceeds back to step 530. For example, in the case of Flash® animation, where shape tweening is used between frames (as in the case of the ball 720 changing shape at impact on base 730) re-tessellation is needed.

3. Further Discussion of Animation File Conversion Example

The operation of converter 130 and steps 520-530 are described further with reference to an example implementation of file player 110 that can play a SWF file and render graphics with an OpenGL®|ES API. This example is illustrative of advantages of an example implementation used in combination with SWF files and OpenGL®|ES API and is not intended to limit the present invention.

Consider that the main geometric elements in a SWF file are images or bitmaps, which can be linearly transformed (typically translation, scale and rotation), and shapes, composed of B-spline curves or simple vector data which can also be scaled and rotated. OpenGL®|ES meanwhile allows the efficient rendering of textured triangles in 3D or 2D. In this way, file player 110 according to an embodiment basically reduces the images or bitmaps in a SWF file to suitable textures in OpenGL®|ES then displays them with a pair of suitably transformed triangles arranged as a quadrilateral (as described above with respect to steps 521-523); and converts the shape information (both B-spline curves and simple vectors) to a collection of suitably transformed and possibly textured triangles (as described above with respect to steps 524-525).

One approach to convert object shape data in step 525 is to approximate a shape defined by a continuous B-spline curve with a set of triangles and then use the OpenGL®|ES API to render the set of triangles. For example, an animated two-dimensional (2D) SWF shape can be rendered on display 330 as follows. First, animate the shapes B-spline curve control data as defined in the SWF file to the current time value. This step may be common to all SWF players whether they use OpenGL®, OpenGL®|ES, or a proprietary software-based renderer. Second, triangulate the area of the B-spline curve defined shape at a degree of linear approximation that is acceptable given the scale of the object with respect to the resolution of the display and the feedback from performance monitoring. A variety of triangulation algorithms are available here. As long as the algorithm is more or less on the order of NlogN in running-time complexity, where N is the number of vertices considered, the algorithm will suffice. In one example, a scan-line or plane-sweep style algorithm may be used. This algorithm generates slabs of trapezoids. The trapezoids are trivially decomposed into a pair of triangles. Alternatively, more complex triangulation algorithms can be used. In an example, the triangulation algorithm, "Triangle: A Two-Dimensional Quality Mesh Generator and Delaunay Triangulator," created at Carnegie Mellon University, version 1.6 released Jul. 28, 2005, available for download at http://www.cs.cmu.edu/~quake/triangle.html, can be used.

Once the triangulation or tesselation of the shape data is complete, the triangles must be prepared for efficient display using the OpenGL®|ES API. The triangles should be arranged in triangle strips or fans or indexed triangle lists. The triangulation algorithm in use lends itself to triangle strips. A set of triangle strips with similar attribute data such as color and texture is typically referred to as a Mesh. Many shapes have a border and this can be converted to line strips in a similar but slightly more simple manner than the triangulation of shape data. Meshes can be rendered using the OpenGL®|ES API entry point glDrawArrays( ) for Triangle Strips or Line Strips or glDrawElements for indexed triangles.

It may be possible to skip re-tesselating at each time step and improve efficiency by transforming the tesselation from an earlier time step via the matrix transform state in OpenGL®|ES API. This may even be possible in cases where the curves morph as long as the topology of the curve remains similar. According to one advantage, an animation file player capable of being run on mobile phones (or other embedded system devices) is provided at a moment in time where there are increasingly large numbers of internet-capable phones with OpenGL®|ES API (or other embedded system graphics APIs) coupled with a large number of SWF files. Embodiments of the present invention then allow such SWF files to be viewed either as components of websites or as entertainment in their own right with an embedded system such as a phone.

According to a further advantage, an animation file player is provided which can also be used with an embedded system provided with a graphics subsystem, such as, a software and/or hardware renderer if available. This is especially advantageous in certain applications since there exist many SWF files that can only be viewed on an embedded system having limited resources if opportunities to gain performance are taken. Otherwise, the playing of animation on an embedded system, like a mobile phone, may consume too many computational resources and the animation will run too slowly to be interesting. Further, many mobile phones are projected to have hardware to accelerate graphics operations. These phones will also include an embedded system graphics API, such as an OpenGL®|ES API, a Java graphics API, or Direct3D Mobile graphics API, provided to give programmers access to that hardware acceleration. Accordingly, certain embodiments of the present invention can meet a particular need for a file player that can display animation in SWF files with graphics hardware acceleration on a mobile phone.

These advantages are illustrative of certain embodiments and not intended to limit the present invention.

C. Conclusion

While various embodiments of the present invention have been described above, it should be understood that they have been presented by way of example only, and not limitation. It will be apparent to persons skilled in the relevant art that various changes in faun and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An embedded computing device including an animation file player for displaying animation with an embedded computing device three dimensional graphics application programming interface (API), comprising:

a memory; and a converter that converts spatial animation information stored in the memory to three dimensional graphics rendering information that can be processed by the embedded computing device three dimensional graphics API to generate pixel data from the three dimensional graphics rendering information, wherein the spatial animation information includes two dimensional object shape data specified by a human author associated with frames in the animation, and wherein the converter tessellates the object shape data for a first animation time step at a degree of approximation in accordance with at least a display resolution of an embedded computing device to obtain a first tessellated mesh for at least one object, and wherein the converter, when the object's shape, once tessellated, changes between the first animation time step and a subsequent animation time step such that mesh vertices of the changed shape cannot be calculated through application of matrix transforms on the first tessellated mesh, re-tessellates the object to obtain a new tessellated mesh for the object in the subsequent animation time step.

2. The embedded computing device of claim 1, wherein the converter further arranges the first tessellated mesh and the new tessellated mesh in a given time sequence including the first and second animation time steps for efficient passing to the embedded computing device three dimensional graphics API.

3. A method for displaying animation through a three dimensional graphics API on an embedded computing device, comprising:
parsing an animation file to obtain human-specified spatial animation information that includes two dimensional object shape data associated with frames in the animation, the object shape data including spline curve data and geometric shape data converting the parsed animation information to graphics rendering information, wherein the converting comprises:
converting the object shape data to a collection of polygons having an area approximating the object shape data;
tessellating the object shape data for a first animation time step at an acceptable degree of approximation in accordance with at least a display resolution of the embedded computing device to obtain a first tessellated mesh for at least one object;
when the object's shape, once tessellated, changes between the first animation time step and a subsequent animation time step such that mesh vertices of the changed shape cannot be calculated through application of matrix transforms on the first tessellated mesh, re-tessellates the object to obtain a new tessellated mesh for the object in the subsequent animation time step; and
arranging the tessellated data for efficient passing to the embedded computing device three dimensional graphics API in a given temporal sequence as defined by time data in the animation file;
processing the graphics rendering information with the embedded computing device three dimensional graphics API to obtain pixel data; and
displaying the pixel data to show the animation.

4. An embedded computing device including an animation file player for displaying animation with an embedded computing device three dimensional graphics application programming interface (API), comprising:
a memory; and
a converter that converts human-specified spatial animation information stored in the memory to a timed sequence of three dimensional graphics rendering information that can be processed by the embedded computing device three dimensional graphics API to generate pixel data,
wherein the spatial animation information includes human-specified two dimensional object data associated with frames in the animation,
wherein the spatial animation information includes object shape data associated with frames in the animation, and
wherein the converter converts object shape data for a first animation time step to a collection of polygons having a configuration approximating the object shape data to obtain a first tessellated mesh for at least one object, and
wherein the converter, when the object's shape, once tessellated, changes between the first animation time step and a subsequent animation time step such that mesh vertices of the changed shape cannot be calculated through application of matrix transforms on the first tessellated mesh, re-tessellates the object to obtain a new tessellated mesh for the object in the subsequent animation time step.

5. The embedded computing device of claim 4, further comprising:
a parser that parses an animation file to obtain the animation information that includes two dimensional object shape data associated with a frame in the animation, the object shape data including spline curve data and geometric shape data.

6. The embedded computing device of claim 5, wherein the animation file comprises a Shockwave Flash® (SWF) file.

7. The embedded computing device of claim 6, wherein the converter converts image data or object shape data associated with a frame in the animation to three dimensional graphics rendering information that can be processed by the embedded computing device three dimensional graphics API.

8. The embedded computing device of claim 6, wherein the embedded computing device three dimensional graphics API comprises at least one of an OpenGL®|ES graphics API, a Java three dimensional graphics API, or a Microsoft Direct3D Mobile graphics API.

9. The embedded computing device of claim 4, wherein the spatial animation information includes image data associated with frames in the animation, and wherein the converter reduces the image data to texture data and generates polygons having texture coordinates mapped to the texture data.

10. An embedded computing device, comprising:
a display;
a memory for storing at least a portion of an animation file;
an embedded computing device three dimensional graphics application programming interface (API); and
an animation file player that: (i) converts human-specified spatial animation information in the animation file to three dimensional graphics rendering information by: (a) tessellating object shape data included in the animation information for a first animation time step at a degree of approximation in accordance with at least a resolution of the display to obtain a first tessellated mesh for at least one object, and, (b) when the object's shape, once tessellated, changes between the first animation time step and a subsequent animation time step such that mesh vertices of the changed shape cannot be calculated through application of matrix transforms on the first tessellated mesh, re-tessellating the object to obtain a new tessellated mesh for the object in the subsequent animation time step, and (ii) passes the graphics rendering information to the embedded computing device three dimensional graphics API to generate pixel data, and
wherein the embedded computing device three dimensional graphics API processes the three dimensional graphics rendering information to obtain pixel data and outputs the pixel data to the display for display on the embedded computing device, wherein the animation information includes two dimensional object shape data.

11. The embedded computing device of claim 10, wherein the animation file comprises a SWF file.

12. The embedded computing device of claim 10, wherein the embedded computing device three dimensional graphics API comprises an OpenGL®|ES graphics API.

13. The embedded computing device of claim 10, further comprising a wireless communication interface.

14. The embedded computing device of claim 10, further comprising a graphics subsystem that includes graphics acceleration hardware that accelerates rendering performed by the embedded computing device three dimensional graphics API.

15. A method for displaying animation through an embedded computing device three dimensional graphics API on an embedded computing device, comprising:
parsing an animation file to obtain human-specified spatial animation information that includes both image data and two dimensional object shape data associated with frames in the animation, the object shape data including spline curve data and geometric shape data;

converting the parsed animation information including image and object shape data to three dimensional graphics rendering information, the converting of the object shape data comprising:

tessellating the object shape data for a first animation time step at a degree of approximation in accordance with at least a display resolution of an embedded computing device to obtain a first tessellated mesh for at least one object, and when the object's shape, once tessellated, changes between the first animation time step and a subsequent animation time step such that mesh vertices of the changed shape cannot be calculated through application of matrix transforms on the first tessellated mesh, re-tessellating the object to obtain a new tessellated mesh for the object in the subsequent animation time step;

processing the three dimensional graphics rendering information with the embedded computing device three dimensional graphics API to obtain pixel data; and displaying the pixel data to show the animation.

16. The method of claim 14, wherein the animation information includes image data associated with frames in the animation, and wherein the converting comprises:

reducing the image data to texture data; and generating polygons having texture coordinates mapped to the texture data.

17. The method of claim 14, wherein the animation information includes object shape data associated with frames in the animation, and wherein the converting comprises:

converting the object shape data to a collection of polygons having an area approximating the object shape data.

18. A system for displaying animation on an embedded computing device having an embedded computing device three dimensional graphics API, comprising:

a means for parsing a Flash® animation file to obtain spatial animation information that includes at least one of two dimensional image data and two dimensional object shape data associated with frames in the animation; and a means for converting the two dimensional image and object shape data to three dimensional graphics rendering information that can be passed to the embedded computing device three dimensional graphics API to generate pixel data, the means for converting comprising:

a means for tessellating the object shape data for a first animation time step at a degree of approximation in accordance with at least a display resolution of the embedded computing device to obtain a first tessellated mesh for at least one object, and when the object's shape, once tessellated, changes between the first animation time step and a subsequent animation time step such that mesh vertices of the changed shape cannot be calculated through application of matrix transforms on the first tessellated mesh, re-tessellating the object to obtain a new tessellated mesh for the object in the subsequent animation time step.

19. A graphics-enabled mobile device, comprising:

a display;

a memory for storing at least a portion of a FLASH® animation file;

an embedded computing device three dimensional graphics application programming interface (API); and an animation file player that: (i) converts human-specified spatial animation information in the animation file to three dimensional graphics rendering information by: (a) tessellating object shape data included in the animation information for a first animation time step at a degree of approximation in accordance with at least a resolution of the display to obtain a first tessellated mesh for at least one object, and, (b) when the object's shape, once tessellated, changes between the first animation time step and a subsequent animation time step such that mesh vertices of the changed shape cannot be calculated through application of matrix transforms on the first tessellated mesh, re-tessellating the object to obtain a new tessellated mesh for the object in the subsequent animation time step, and (ii) passes the graphics rendering information to the embedded computing device three dimensional graphics API to generate pixel data, and wherein the embedded computing device three dimensional graphics API outputs the pixel data to the display for display on the graphics-enabled mobile device.

20. The graphics-enabled mobile device of claim 18, further comprising: graphics acceleration hardware that accelerates rendering performed by the embedded computing device three dimensional graphics API.

21. The graphics-enabled mobile device of claim 19, wherein the embedded computing device three dimensional graphics API comprises an OpenGL®|ES graphics API.

* * * * *